US007249447B2

(12) United States Patent
Diaz

(10) Patent No.: US 7,249,447 B2
(45) Date of Patent: Jul. 31, 2007

(54) HORSE TRAINING ASSEMBLY

(76) Inventor: Pedro Ruiz Diaz, Ricardo Balbin 4335, Buenos Aires (AR) C1430ABB ( * ) Notice: Subject to any disclaimer, the term of this patent is extended or adjusted under 35 U.S.C. 154(b) by 0 days.

(21) Appl. No.: 11/428,714

(22) Filed: Jul. 5, 2006

(65) Prior Publication Data

US 2007/0028568 A1 Feb. 8, 2007

(51) Int. Cl.
*B68B 1/00* (2006.01)
*A01K 15/02* (2006.01)

(52) U.S. Cl. .......... 54/71; 119/814

(58) Field of Classification Search .......... 54/71, 54/72; 119/818, 819, 820, 815, 814
See application file for complete search history.

(56) References Cited

U.S. PATENT DOCUMENTS 77,234 A * 4/1868 York .......... 54/71
85,158 A * 12/1868 York .......... 54/6.1
589,564 A * 9/1897 Jerome .......... 54/71
626,317 A * 6/1899 Brown .......... 54/71
659,856 A * 10/1900 Neagle .......... 54/71
727,550 A * 5/1903 Minck .......... 54/71
854,536 A * 5/1907 Shaver .......... 54/71
2,814,923 A * 12/1957 Knauss .......... 54/71
4,864,804 A * 9/1989 Clemens .......... 54/71

* cited by examiner

*Primary Examiner*—Son T. Nguyen
(74) *Attorney, Agent, or Firm*—Norris, McLaughlin & Marcus, P.A.

(57) ABSTRACT

An assembly for training and/or instruction of horses, for maintaining, building-up and improving the muscles and stance and posture of the horse by making the animal to walk or trot in the correct positions and stances, with the assembly comprising a girth fixed to the breast portion of the animal's body, the girth having a plurality of connecting points to which a rear cord and side cords are connected, with both cords connected to a rear tensor, wherein the cords and the tensor forces the animal to adopt a desired stance during the training thereof.

9 Claims, 3 Drawing Sheets

HORSE TRAINING ASSEMBLY

BACKGROUND OF THE INVENTION

1. Field of the Invention

The present invention relates to the field of instruction and training of animals, more specifically horses, and more particularly it refers to an assembly, device, equipment or aid for instruction and/or training of horses, preferably horses for sportive activities like jumping, racing, polo, etc.

2. Description of the Prior Art

Horses for sportive activities require special care with the purpose of keeping the animal healthy and with muscles properly trained for competition. In addition to the sanitary and feeding care these horses must be trained for walking, lungeing, jumping, galloping, trotting, etc.

One of the common trainings consists of making the horse walking in a circle, with or without saddle, around a trainer controlling the horse by means of a cord or rope fixed to a belt or girth worn by the horse. This technique permits to instruct and/or train the walking muscles as well as it focuses in keeping the head and neck of the horse in a correct position without attending, however, to the build-up and training of the horse's back muscles.

It would be therefore very convenient and necessary to have a new training and/or instruction aid for horses that permits to get a complete build-up of the horse muscles as well as to assist the horse to have a better and correct position according to the type of march or walking thereof.

SUMMARY OF THE INVENTION

It is therefore an object of the invention to provide a harness assembly or arrangement, or merely a training harness or aid, easy to be installed in the horse, not disturbing or uncomfortable for the horse, and that it permits the trainer to easily manage and control the animal walking and the postures and stance thereof.

It is still another object of the present invention to provide a training and/or instruction assembly for horses, that permits to keep, build-up and improve the stance, postures and muscles of the horse, causing the horse to walk or trot in correct positions, wherein the assembly comprises a belt or girth that is fixed around the animal, preferably in the breast thereof, with a rear cord or rope or line, and side cords, or ropes or lines, connected both to a rear elastic tensor and to selective connecting points of the girth, wherein the cords and the tensor cause the animal to adopt a desired position or stance or posture when walking for training.

It is a further object of the present invention to provide a horse training and/or instructing assembly comprising a girth having a plurality of connecting points, a rear tensor extending behind the horse rear legs and having two ends, one end at each side of the horse, at least one a rear cord having a rear cord middle point connected to a first connecting point of said plurality of connecting points of the girth, and two rear cord ends each one connected to one of the ends of the rear tensor, and at least a pair of side cords each side cord extending at a side of the horse, wherein each side cord has a rear end connected to one end of the rear tensor and extends from the rear tensor towards the head of the horse, passes through a bit of a harness worn by the horse and turns back to define a forward cord section that is adjustably fastened to a second connecting point of the plurality of connecting points in the girth.

The above and other objects, features and advantages of this invention will be better understood when taken in connection with the accompanying drawings and description.

BRIEF DESCRIPTION OF THE DRAWINGS

The present invention is illustrated by way of example in the following drawings wherein.

DESCRIPTION OF THE PREFERRED EMBODIMENTS

Now referring in detail to the Figures it may be seen that the assembly of the invention comprises a belt or girth 1 that may be of any appropriate material, preferably leather, and it is placed around the animal body, for instance around the breast region, as it is illustrated. The girth, according to the invention, include a plurality of connecting points such as a first connecting point 3 and a plurality of second connecting points 4, 5, 6, 7, to all of which points reference will be made below. Each one of these connecting points may comprise a close ring or any other element for permitting a detachable connection of hooks, shackles, etc.

Figure 1:
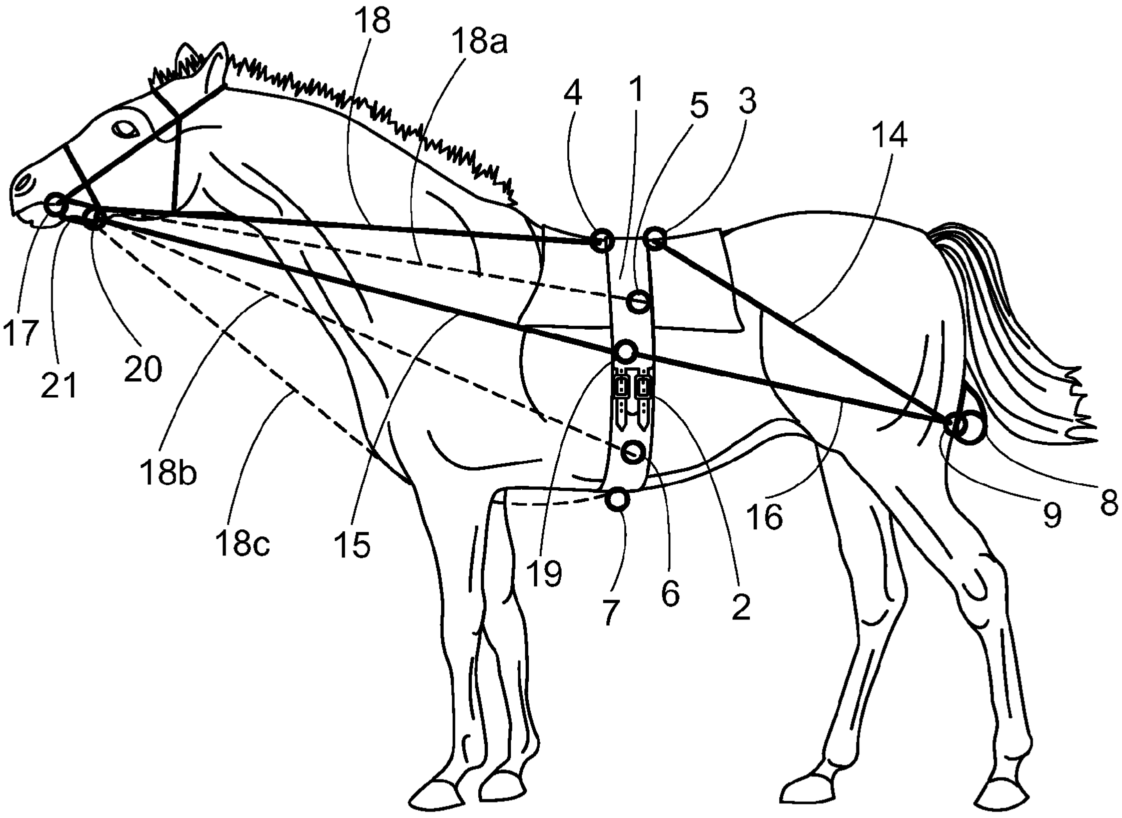
FIG. 1 shows a horse wearing a harness assembly according to the invention for instruction and/or training, with phantom lines illustrating the several different positions that the forward cord section of the assembly can have.
Figure 5:
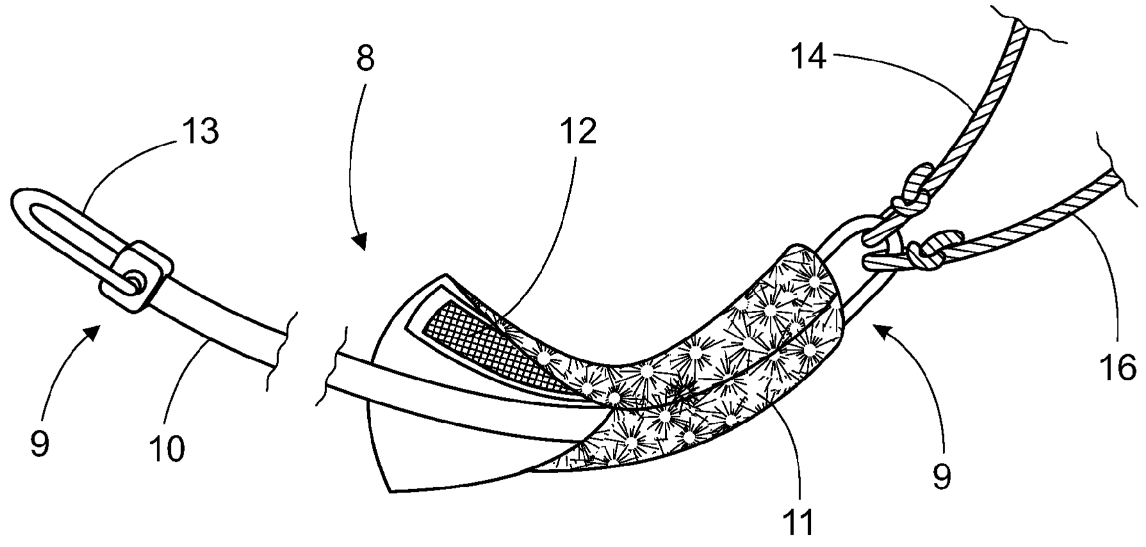
FIG. 5 shows a perspective and partial sectional view of the rear tensor of the assembly according to the invention.
Figure 2:
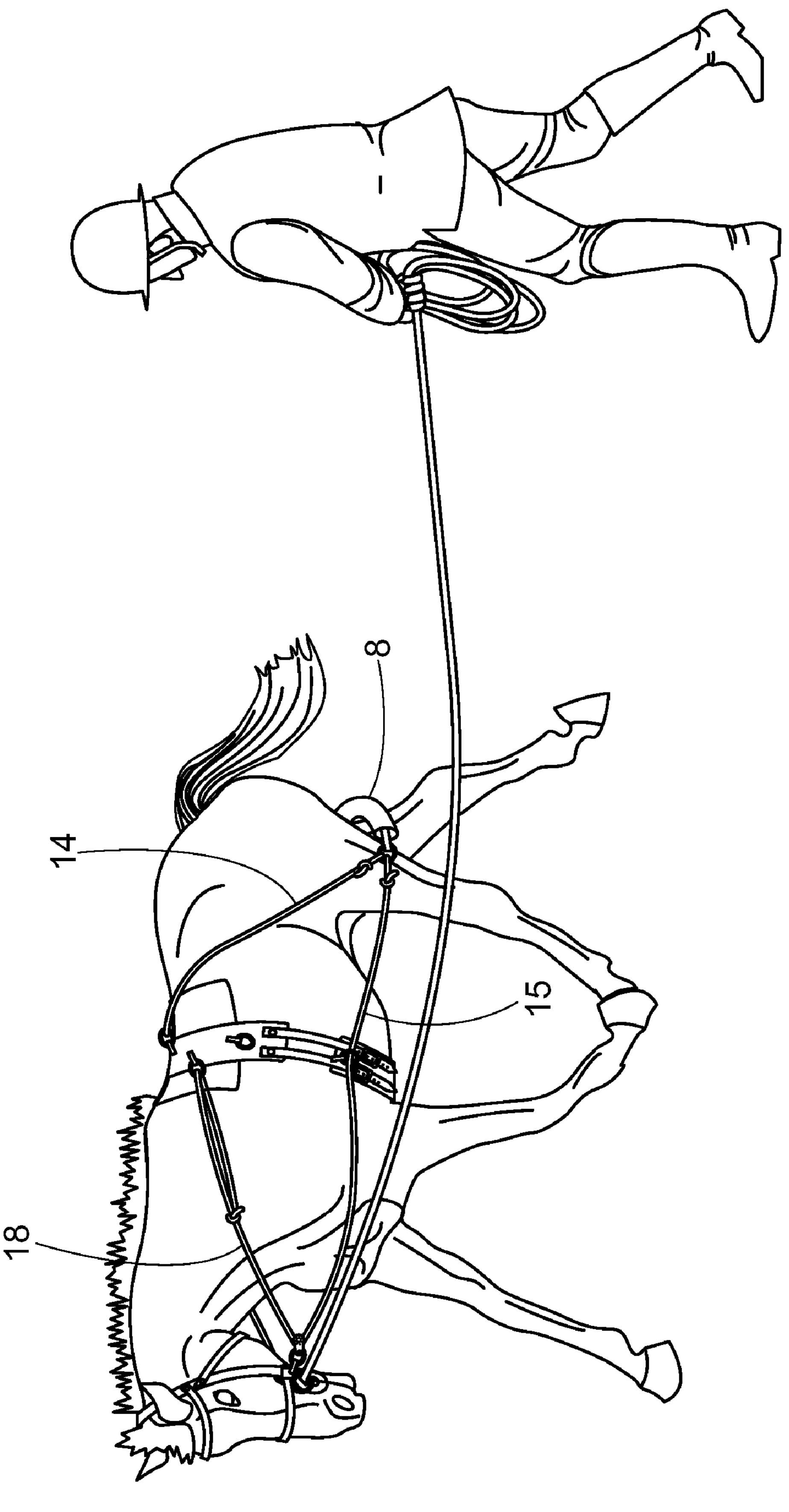
FIG. 2 shows a horse during training with an assembly of the invention placed in one of the training positions of same.

In the back side of the horse, preferably behind the hindquarters, below the tail and above the joints of the rear legs, a rear tensor 8 is arranged and extended behind the animal's legs, with an end 9 placed at each side of the horse. Tensor 8 comprises a core 10 made of elastic material, preferably rubber, and wrapped into a removable cover or liner made of a soft material, such as a textile material or mat or foam, for protecting the animal. This cover may have a closure means of the type of loops-and-hooks 12 for opening the cover in order to remove the tensor core for servicing purposes. As it is better shown in FIG. 5, each end of core 10 has an enlargement portion including an elongated ring for connecting to the harnesses and cords, as shown in FIG. 1.

Also in the back side of the animal, that is the croup or rump, the inventive assembly has at least one rear cord, line or rope 14 having a rear cord middle point connected to first connecting point 3 of the girth. Cord 14 passes through point 3, extending downwardly at both sides of the hindquarters of the horse, and includes two rear cord ends of which only one is shown, with each end at each side of the horse and each end connected to each one of ends 9 of rear tensor 8, as shown in FIG. 1.

At both sides of the horse the assembly has at least a pair of side cords or lines, each one indicated by reference 15 and extended at each side of the animal. Each side cord 15 has a rear end 16 connected to one of ends 9 of tensor 8 with cord 15 extending from end 16 towards the horse's head, passing through a bit 17 of the brake and turning back to define a forward cord section 18 that ends by selectively connecting, in a adjusting and/or regulating manner, to at least one of second connecting points 4, 5, 6, 7 of girth 1.

The plurality of said second connecting points 4–7 is arranged at each side of the horse and said forward cord section 18 of respective cord 15 ends by selectively fixing or connecting to one of said second connecting points of the girth according to a predetermined training pattern. Each one of said second connecting points 4–7 as well as the first connecting point 3 may comprise rings, loops, etc. and said forward cord section 18 can end in a shackle or any other fast and detachable connection system proper for permitting a quick and detachable connection to the corresponding ring in the girth.

Each cord 15 has, at a middle portion thereof, a sliding connection 19 in a connecting point of the girth, wherein said sliding connection may comprise a ring fixed to the girth and cord 15 may pass through said ring.

The pass of side cord 15 through point 17 of the brake bit may be made by providing a ring or a pulley 20 that is detachably fixed to the bit by means of a shackle 21 or any other fastening or connection means. The lines or cords of the invention may be of any proper material such as leather, plastics, polymeric threads, etc.

For use, the inventive assembly is installed or placed in the animal as it is shown in FIGS. 1–4 according to the type of predetermined training or instruction. The harness assembly of the invention permits to make trainings with the horse being saddled or not, or with a rider or not. Reins may be used if the training is with a rider. The inventive assembly permits, among other things, to make the horse keeping the head downwardly inclined wit the nose low.

Depending on the way section 18 is connected selectively to points 4–7 different trainings would be carried out. For example, if cord section 18 is connected to connecting point 4 of the girth, the horse will be trained in a dressage position where the horse carries itself in a much more upright stance. This position can be seen in FIG. 4.

If the end of cord 18 is connected to point 5 of the girth, namely position indicated with reference 18*a* in FIG. 1, the horse takes an upright stance that is similar to the position the horse has when he is ridden. This position, which can be seen in FIG. 2, helps the animal build-up the final muscles that are necessary for the animal to be in perfect balance when moving in a half gallop.

Figure 3:
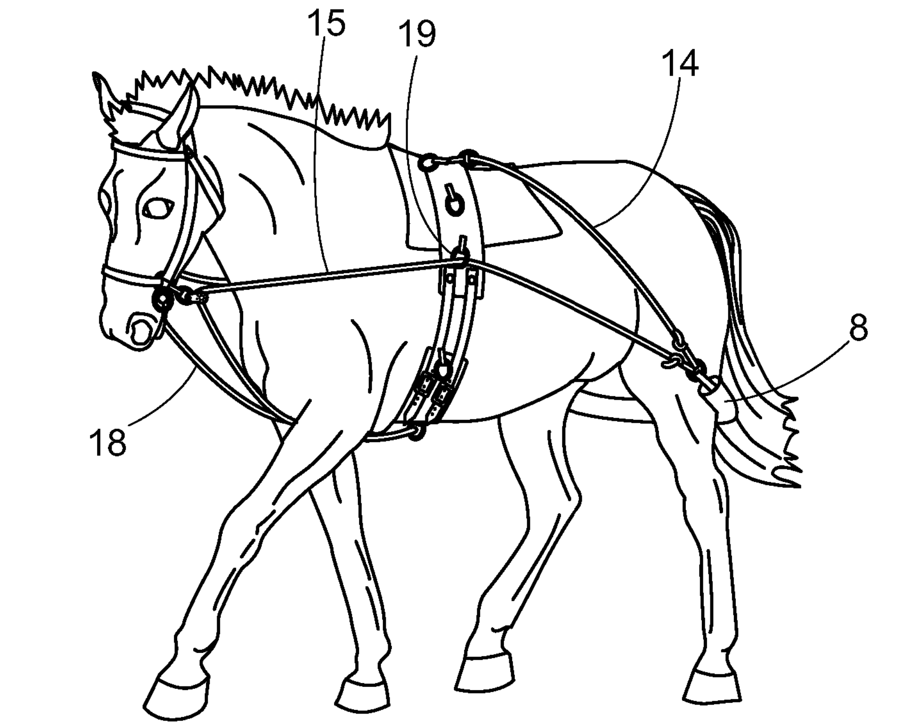
FIG. 3 shows a horse during training with an assembly of the invention placed in another training position of the assembly.
Figure 4:
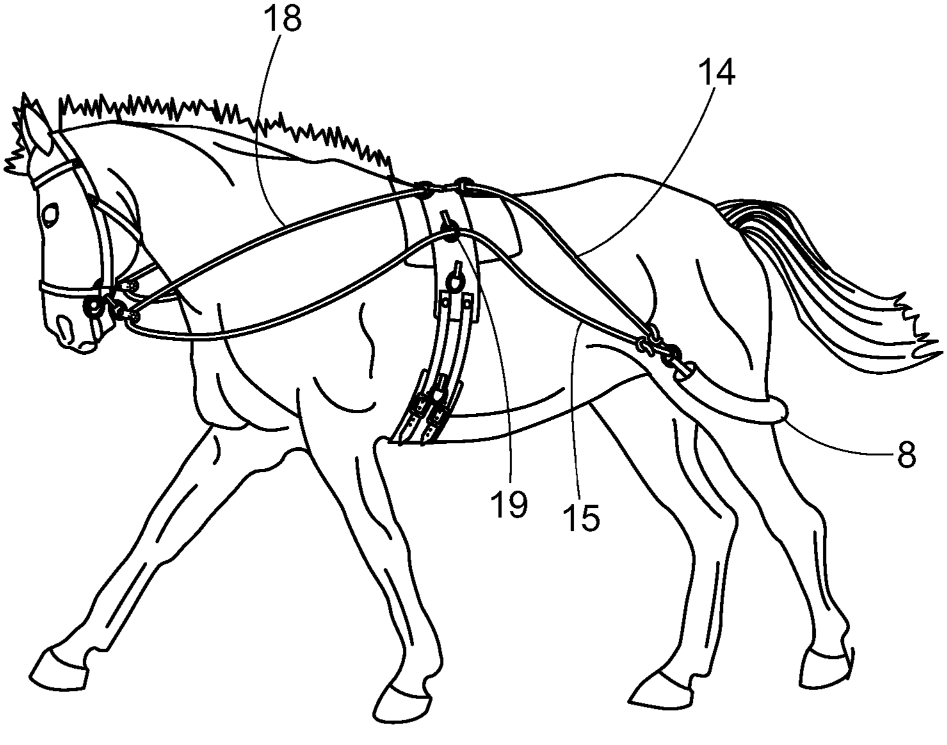
FIG. 4 shows a horse during training with an assembly of the invention placed in still another training position.

Connecting point 6 is employed to connect cord 18, as indicated by 18*b* in FIG. 1, in order to get what is called a middle position to help building-up the upper muscles of the horse's neck. Finally, when connecting cord section 18 to point 7, the cord is passed through pulley 20 in the bit and then cord 18, from each side of the horse, extends downwardly along the front side of the horse and between the front legs of the animal as illustrated in phantom lines 18*c* in FIG. 1. This position, which also can be seen in FIG. 3, is named low position and serves to introduce the animal in the use of the inventive assembly and, due to the tension applied over the animal spine, helps to bring the animal's shoulders upwardly.

As can be appreciated from the above disclosure and drawings the training system of the invention permits a varied, more complete and better training and/or instruction activities for the horse, wherein better results are obtained for the build-up of the horse's muscles and stance.

I claim:

1. A horse training assembly comprising:

a girth having a plurality of connecting points, a rear tensor extending behind the horse rear legs and having two ends, one end at each side of the horse, at least one a rear cord having a rear cord middle point connected to a first connecting point of said plurality of connecting points of the girth, and two rear cord ends each one connected to one of the ends of the rear tensor, and at least a pair of side cords each side cord extending at a side of the horse, wherein each side cord has a rear end connected to one end of the rear tensor and extends from the rear tensor towards the head of the horse, passes through a bit of a harness worn by the horse and turns back to define a forward cord section that is adjustably fastened to a second connecting point of the plurality of connecting points in the girth.

2. The assembly of claim 1, wherein each side cord has a middle portion which in turn includes a sliding connection to a connecting point of the girth.

3. The assembly of claim 2, wherein said sliding connection comprises the passing of the side cord through a connecting ring in the girth.

4. The assembly of claim 1, wherein said at least one second connecting point in the girth comprises a plurality of second connecting points at each side of the horse and said forward cord section selectively connects to one of said second connecting points in the girth.

5. The assembly of claim 4, wherein the girth comprises a plurality of connecting rings, with each of said connecting points in the girth comprising one of said connecting rings, and said forward cord section has an end with a shackle detachably connected to one of said connecting rings.

6. The assembly of claim 1, wherein the passing of said side cord through the bit of the horse comprises the passing of the side cord through a pulley that is detachably connected to the bit through a shackle.

7. The assembly of claim 1, wherein said rear tensor is made of elastic material.

8. The assembly of claim 7, wherein said rear tensor comprises a rubber core wrapped into a removable material for protecting the horse.

9. The assembly of claim 1, wherein said cords are made of a polymeric material.

* * * * *